United States Patent [19]

Hulek

[11] Patent Number: 4,615,677
[45] Date of Patent: Oct. 7, 1986

[54] ARRANGEMENT FOR RECOVERING THE SENSIBLE HEAT OF DUMPABLE HOT STOCK

[75] Inventor: Anton Hulek, Linz, Austria

[73] Assignee: Voest-Alpine Aktiengesellschaft, Linz, Austria

[21] Appl. No.: 769,459

[22] Filed: Aug. 26, 1985

[30] Foreign Application Priority Data

Sep. 6, 1984 [AT] Austria ................... 2857/84

[51] Int. Cl.$^4$ .................. F27D 15/02; B22D 18/02
[52] U.S. Cl. ..................... 432/77; 165/120; 432/80; 432/83
[58] Field of Search ............. 432/77, 80, 83; 266/201, 241; 165/120; 122/27

[56] References Cited

U.S. PATENT DOCUMENTS

| | | | |
|---|---|---|---|
| 1,626,292 | 4/1927 | Lund | 266/201 |
| 2,286,078 | 6/1942 | Gallai-Hatchard | 266/201 |
| 3,517,164 | 6/1970 | Huggins et al. | 165/120 |
| 4,274,536 | 6/1981 | Riegler et al. | 165/120 |
| 4,420,304 | 12/1983 | Nakatani et al. | 266/201 |

FOREIGN PATENT DOCUMENTS

| | | | |
|---|---|---|---|
| 52-132454 | 7/1977 | Japan . | |
| 2025588 | 1/1980 | United Kingdom | 432/77 |

Primary Examiner—John J. Camby
Attorney, Agent, or Firm—Collard, Roe & Galgano

[57] ABSTRACT

An arrangement for recovering the sensible heat of dumpable hot stock includes a continuous conveying belt guided about at least two deflection pulleys and formed by articulately connected plates. The carrying run of the conveying belt with the hot stock applied thereon and the empty lower run each are guided through a cooling zone. In order to recover the sensible heat from the hot stock to an extent as large as possible and with a high efficiency, without having to use a bed covering material, the plates of the conveying belt are designed to include at least two layers, an outwardly carrier layer receiving the hot stock and an inwardly arranged insulation layer.

18 Claims, 10 Drawing Figures

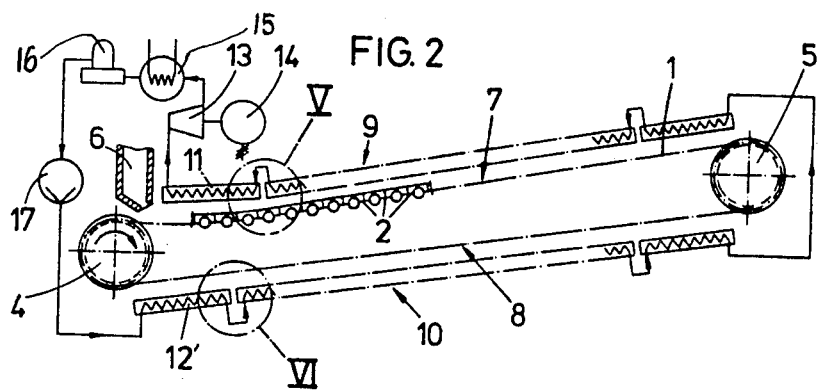

ARRANGEMENT FOR RECOVERING THE SENSIBLE HEAT OF DUMPABLE HOT STOCK

The invention relates to an arrangement for recovering the sensible heat of dumpable hot stock, in particular of molten blast furnace slag or unquenched coke, comprising a continuous conveying belt guided about at least two deflection pulleys and formed by articulately connected plates, the carrying run of the conveying belt with the hot stock supported thereon and the empty lower run each being guided through a cooling zone.

An arrangement of this type is known from Japanese Published Application No. 52-132454. The plates of the conveying belt, which are designed like troughs to receive the hot stock, are loaded with a bed covering material prior to charging the hot stock, whereupon the hot stock is loaded onto the bed covering material. The provision of a special bed covering material, in addition to additional expenditures in terms of process technology, also involves additional expenditures in terms of mechanical engineering, because a separate charging station must be provided for the bed covering material.

Furthermore, it is necessary to control the height and uniformity of the bed covering material after its application prior to loading of the hot stock to prevent damage to the conveying belt by the hot stock. The bed covering material causes the temperature levels of the hot stock and of the plates of the conveying belt to decrease, thus reducing the value of the recovered heat.

The invention aims at avoiding these disadvantages and difficulties and has as its object to provide an arrangement of the initially defined kind, with which the sensible heat from hot stock can be recovered to as large an extent as possible and with a high efficiency, without using a bed covering material.

In accordance with the invention, this object is achieved with a conveying belt comprised of plates including a carrier layer receiving the hot stock and an insulation layer underlying the carrier layer.

With the arrangement according to Japanese Published Application No. 52-132454, the hot stock lying on the carrier run, and the lower run of the conveying belt are cooled by air, which is conveyed through the two cooling zones by means of a fan. The temperature level of the recovered heat is not very high, calling for large fan performances, heat exchanger surfaces, filtering plants, etc.

To eliminate this disadvantage, it is provided according to a preferred embodiment of the invention that the carrier layers are designed as storage plates, and a cooling means in contact with the storage plates is arranged along the lower run, through which cooling means a cooling medium flows, preferably guided in a thermodynamic circulation. The storage plates, thus, are recooled by mere thermal conduction, i.e., without any intermediate medium, which provides a particularly effective heat recovery.

Instead of the storage plates contacting the cooling means, there are provided, according to another preferred embodiment, coolant-penetrated cooling plates along the lower run, which are arranged at a slight distance below the lower run, recooling of the storage plates also being effected without any intermediate medium, namely by radiation.

A further preferred embodiment is characterized in that the plates are fastened to chain links hinged to each other, the plates suitably being guided along guide rails by means of guide rollers arranged on the chain links.

Preferably, the cooling means is comprised of consecutively arranged hollow cooling plates, the upper surfaces of the cooling plates being designed as smooth sliding surfaces contacting the plates of the conveying belt.

In order to ensure a good contact of the cooling plates with the storage plates, the cooling plates advantageously are resiliently supported on the base.

A particularly simple design of the insulation layer is characterized in that the insulation layer is designed as a rigid grid.

Suitably, the carrier layers and the insulation layers are fastened to an inherently rigid substructure which, preferably, is designed as a hollow box. The fastening of the carrier layers and of the insulation layers on the substructure is effected by means of resiliently biassed pivotable screws in order to allow for an unhampered temperature-dependent extension of the plates.

In order to obtain a close contiguity of the plates of the conveying belt at the charging station of the hot stock, the carrier run advantageously is guided along a concave downwardly directed guide at least at the charging station of the dumping stock.

Adjacent plates may be held in position pressed against each other, according to a further embodiment, by connecting the plates by means of spring-loaded pins guided in longholes.

In order to prevent the hot stock charged onto the conveying belt from flowing back prior to its solidification, the carrier run suitably is guided so as to slightly go down at the hot stock charging station and rise only after the same.

Advantageously, the deflection pulley neighboring the hot stock charging station is driven, whereby the plates of the conveying belt are pushed on the carrier run, being tightly contiguous to each other.

Suitably, the cooling means of the lower run is connected in series with at least one cooling means designed as a heat exchanger and arranged in the cooling zone of the carrier run.

In order to prevent granular hot stock from penetrating between two plates of the conveying belt in the region of the idling deflection pulley, a ledge bridging the joint towards the neighboring plate and extending to below the storage plate of the neighboring plate preferably is arranged on the lower side of the storage plate.

When using the arrangement for hot stock that must be cooled under the exclusion of air (for instance, when dry-quenching coke), the cooling zone of the carrier run suitably is sealed relative to the conveying belt by a labyrinth seal and comprises a feed line for the supply of inert gas into the cooling zone.

The invention will now be explained in more detail by way of several embodiments and with reference to the accompanying drawings, wherein:

FIGS. 1 and 2 are the schematic illustrations of two different embodiments;

FIGS. 5 and 6 illustrate details V and VI of FIG. 2 on an enlarged scale;

Figure 1:
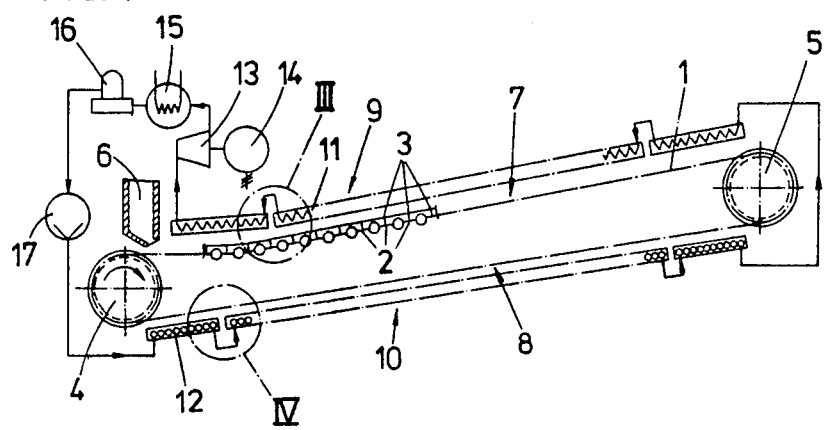
Figure 7:
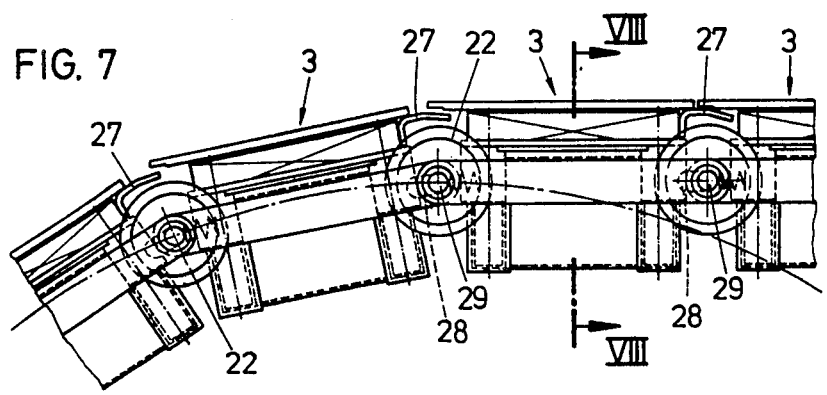
Figure 9:
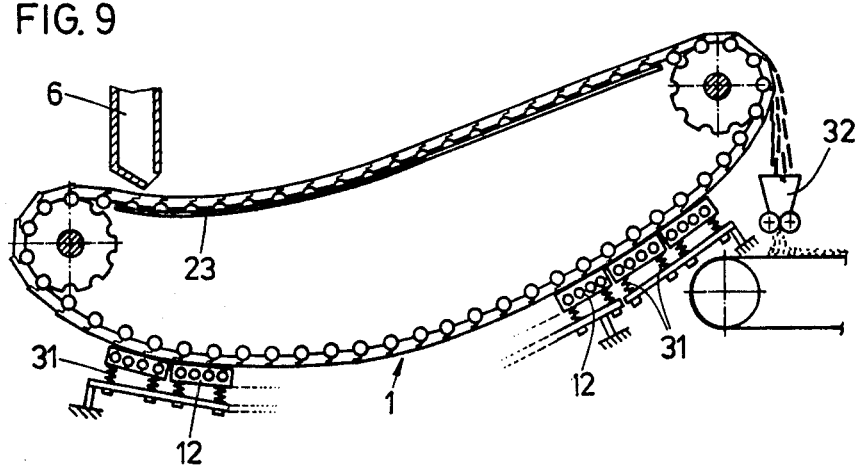
Figure 10:
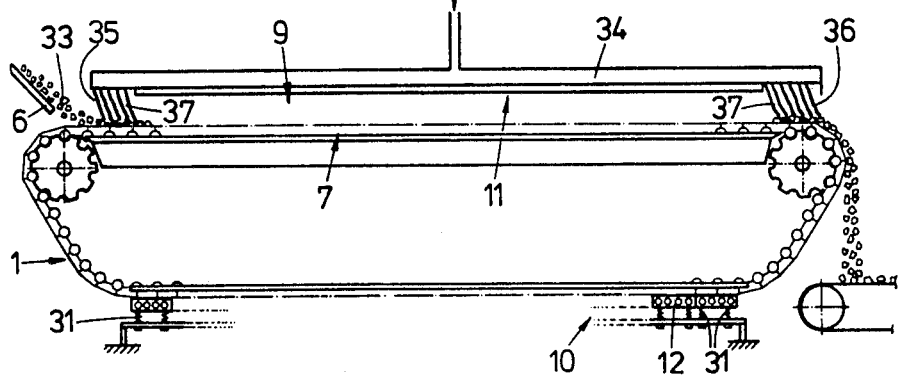

FIGS. 7 and 8 illustrate in detail the structural design of the plates of the conveying belt, FIG. 7 being a side view analogous to FIGS. 1 and 2, and FIG. 8 being a cross section along line VIII—VIII of FIG. 7; and FIGS. 9 and 10 represent further embodiments in illustrations analogous to FIGS. 1 and 2.

With reference to FIG. 1, a continuous conveying belt 1 is comprised of chain elements or chain links 2 hinged to each other, to which plates 3 of trough-shaped cross sections are fastened. The conveying belt is guided about two deflection pulleys 4, 5, pulley 4 arranged more closely to the hot stock charging station 6 being driven. Both the carrier run 7 and the lower run 8 of the conveying belt are guided through cooling zones 9 and 10, in which cooling means 11, 12, through which a coolant flows, are consecutively arranged.

The coolant, preferably water, which initially is heated while flowing through the cooling zone 10 of the lower run 8, subsequently flows through the cooling zone 9 of the carrier run 7 and is guided in a thermodynamic circulation. The steam formed from the coolant after having flown through the cooling zone 9 of the carrier run 7 is supplied to a turbine 13 driving a generator 14. From the turbine 13, the released steam is supplied to a condenser 15. The coolant emerging from the condenser reaches a feed water tank 16 with degasser. By means of a pump 17, the water is returned to the cooling zone 10 of the lower run 8 from the feed water tank 16.

Figure 3:
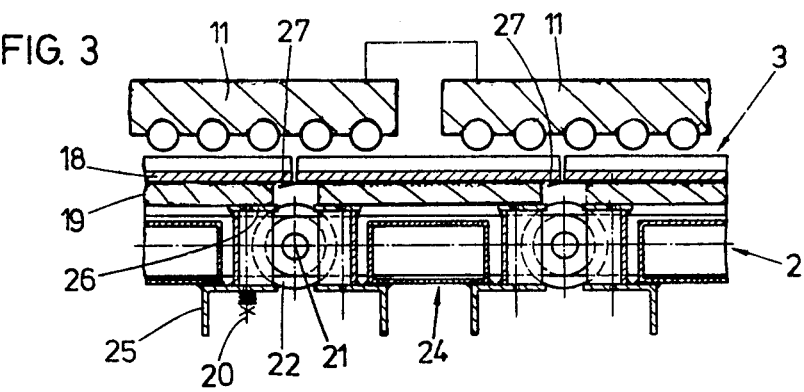
FIGS. 3 and 4 illustrate details III and IV of FIG. 1 on an enlarged scale.

The structure of the plates 3 supporting the hot stock is apparent from FIGS. 3, 7 and 8. The plates 3 are formed by an upper carrier layer 18 in direct contact with the hot stock and, according to FIG. 3, preferably designed as a storage plate having a thickness of from 10 to 20 mm, and an insulation layer 19 lying therebelow. The carrier layer 18 and the insulation layer 19 are fastened to a substructure of the chain links 2 by means of resiliently biassed clamping bolts 20 in order to allow for a temperature-dependent extension such that the plate remains as distortion-free and plane as possible despite thermal extensions and thermal tensions, even after a longer period of operation. In order to reduce thermal tensions in the carrier layer 18, the latter preferably is provided with round grooves (not illustrated). The insulation layer 19 advantageously is designed as a one or multi-layer rigid grid.

On the articulation sites 21 of the chain links, guide rollers 22 are journaled, by means of which the conveying belt 1 is guided along guide rails 23 (illustrated in FIG. 9) arranged on the carrier run 7 and on the lower run 8. The substructure of each chain link 2 comprises a hollow box 24 to which corner irons 25 and flat irons 26 are welded to constitute a support of the storage plate 18 on the box 24. The guide rollers 22, on either side of the plate belt, are outside of the hot zone.

In order to prevent the penetration of hot stock between two neighboring storage plates 18, one of the two neighboring storage plates 18 comprises a ledge 27 reaching as far as the ledge of the subsequent storage plate 18.

Since the deflection pulley 4 arranged at the charging station 6 is driven, the chain links 2 and, thus, the plates 3 are pushed along the carrier run 7, thus eliminating any gap at the articulation sites 21 of the chain links 2 between two neighboring storage plates 18. In order to eliminate any gap whatsoever at the charging station 6, the conveying belt 1 is guided along concave, downwardly directed guides, as is apparent from FIG. 9.

A close contiguity of the adjacent storage plates 18 can be achieved also by realizing the connection of the plates 3 by means of spring-loaded pins 29 guided in longholes 28, by which neighboring plates 3 are pressed against each other (cf. FIG. 7).

Figure 4:
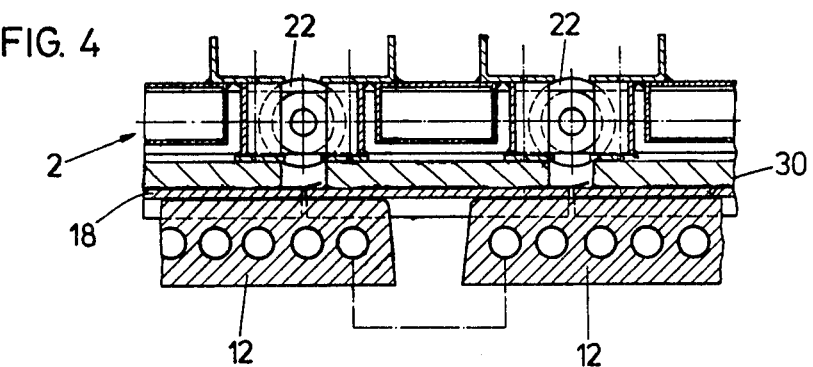

As can be seen from FIG. 4, the cooling means 12 arranged along the lower run 8 of the conveying belt 1 is formed by consecutively arranged cooling plates defining passages through which coolant flows and on whose smooth upper surfaces 30 the storage plates 18 of the conveying belt 1 rest. The storage plates 18 heated by the hot stock, are thus cooled by sliding contact with the cooling plates 12, which preferably are made of cast iron. Therefore, recooling is effected by mere thermal conduction, i.e., without any intermediate medium.

In order to ensure a good contact between the cooling plates 12 and the plates 3 of the conveying belt 1, the cooling plates are supported on the base by means of springs 31, as is illustrated in FIG. 9.

The arrangement functions in the following manner:

The hot stock, for instance blast furnace slag, is poured onto the conveying belt 1 and solidified in few seconds due to the intensive heat absorption by the storage plates 18. The solidifying slag gives off its heat both to the cooling elements 11 arranged along the carrier run 7 and to the storage plates 18. Heating of the storage plates depends on the ratio of the thickness of the storage plates to the thickness of the material layer applied thereon. Preferably, heating of the storage plates to about 600° C. is sought.

At the end of the carrier run 7, the slag has already completely solidified, is extremely brittle on account of thermal tensions and has cooled to about 800° C. on its way from the charging station 6, where it has a temperature of about 1400° C. When the conveying belt 1 is deflected about pulley 5, it is automatically thrown off and may be further broken for other purposes immediately by means of a spike breaker 32 or the like (FIG. 9) with a very low driving performance.

The storage plates 18 freed from the hot stock subsequently are mechanically cleaned to the necessary extent and, if desired, are slightly greased with graphite powder or the like so that they will easily slide over the cooling plates 12 arranged along the lower run 8. By the contact with the cooling plates 12, the storage plates 18 are cooled to 400° to 300° C.

As it enters the cooling plates 12 of the lower run 8, the coolant has a temperature of about 100° C., leaves the last cooling plate at the lower run 8 at about 210° C. and a pressure of 20 bar, and is heated along the carrier run 7 to about 300° C.

Due to the insulation layer 19 of the plates 3, a thermal loss is largely prevented. The supporting substructure 24 of the plates 3 remains without any substantial thermal load and, thus, distortion-free. The distortion-free substructure, moreover, guarantees that the storage plates 18 remain distortion-free so that a good contact between them and the cooling plates 12 is ensured.

In the same manner as one is able to recover the sensible heat of blast furnace slag by means of the above-described arrangement, this is feasible also with other hot stock in metallurgical works, such as sintering plants or the like.

To recover the sensible heat of LD slag, the arrangement suitably is designed as illustrated in FIGS. 2, 5 and 6. No high cooling velocity is required for the solidification of LD slag so that the storage plates need have no high thermal capacities and the carrier layer 18' may be made of relatively thin heat-resistant sheet or plate. This heat-resistant sheet or plate 18' preferably is corrugated, having a thickness of about 4 mm. In this case, the cooling elements 12' of the cooling zone 10 along the lower run 8 are designed to be approximately equal to the cooling elements 11 of the cooling zone 9 along the carrier run 7, i.e., the heat absorbed by the thin sheets or plates 18', on the lower run, likewisely is given off to the coolant by radiation, thus again avoiding an intermediate medium for heat transmission.

In order to prevent the hot stock from flowing back when charged onto the conveying belt 1, the conveying belt 1 is guided so as to slightly go down at the charging station 6 and slightly go up subsequently, as is illustrated in FIG. 9.

The arrangement according to the invention may also be used for the dry-quenching of coke, wherein the heat released during dry-quenching may be recoverd. An embodiment provided therefor is illustrated in FIG. 10. The conveying belt 1 itself and the cooling zones 9, 10 basically are designed as illustrated in FIG. 1. The red hot coke charged onto the conveying belt 1 in a thin layer approximately corresponding to the diameter of the largest coke piece 33 is transported into the cooling zone 9 along the carrier run 7. During this transportation, the red hot coke radiates its heat upwards onto the cooling elements 11 and downwards onto the storage plates 18 of the conveying belt 1 designed according to FIGS. 3 and 4.

In order to prevent a continued burning or a gas explosion during the transportation of the coke on the carrier run 7 of the conveying belt 1, the cooling zone 9 is housed in a passage tunnel 34, into which nitrogen or another gas having analogous function is injected. The tunnel entry 35 and the tunnel exit 36 are each sealed by labyrinth seals 37 to such an extent that a minimum overpressure will do for the nitrogen and the amount of nitrogen emerging at the tunnel openings 35, 36 remains very low.

After leaving the passage tunnel, the coke has cooled so much that it will not burn on contact with air. In case further cooling is required, this may be effected in any way, by air, by a further plate belt or by cooled vibration conveying chutes.

The particular advantage of the arrangement according to the invention for the dry-quenching of coke as compared to wet-quenching is to be seen in that a major part of the thermal content of the coke may be recovered, that the loss of coke by small coke particles being taken away by steam is prevented and that the environment is no longer charged with coke dust, offgases and waste waters.

What I claim is:

1. In an arrangement for recovering the sensible heat of dumpable hot stock, including an endless conveying belt trained about two deflecting pulleys guiding the belt through an upper carrier run adapted to receive the hot stock and an empty lower run, the conveying belt being formed by articulately connected links, a first cooling zone for the upper carrier run and a second cooling zone for the empty lower run, the improvement comprising hot stock receiving plates fastened to each conveying belt link, each plate comprising a carrier layer supporting the hot stock and a heat insulating layer underlying the carrier layer.

2. In the arrangement of claim 1, the second cooling zone comprising a cooling means arranged along the empty lower run in sliding contact with the carrier layers of the plates, the cooling means defining passages for a coolant flowing therethrough.

3. In the arrangement of claim 2, the cooling means comprising consecutively arranged cooling plates having smooth upper slide surfaces in said sliding contact.

4. In the arrangement of claim 3, a support base and means resiliently supporting the cooling plates on the base.

5. In the arrangement of claim 2, a further cooling means forming a heat exchanger connected in series to the cooling means and arranged in the first cooling zone.

6. In the arrangement of claim 1, the second cooling zone comprising cooling plates arranged along the empty lower run at a slight distance from the carrier layers of the plates, the cooling plates defining passages for a coolant passing therethrough.

7. In the arrangement of claim 6, a further cooling means forming a heat exchanger connected in series to the cooling means and arranged in the first cooling zone.

8. In the arrangement of claim 1, guide rollers arranged on the conveying belt links and guide rail means guiding the rollers for guiding the conveying belt.

9. In the arrangement of claim 1, the heating insulating layers of the conveying belt plates being rigid grids.

10. In the arrangement of claim 1, the links comprising a rigid substructure to which the plates are fastened.

11. In the arrangement of claim 10, the rigid substructure being designed as a hollow box.

12. In the arrangement of claim 10, resiliently biassed pivotable screws fastening the plate to the substructure.

13. In the arrangement of claim 1, a concave, downwardly directed guide for the carrier run of the conveying belt adjacent a charging station of the hot stock.

14. In the arrangement of claim 1, spring-loaded pins guided in elongated slots for pressing adjacent ones of the plates against each other.

15. In the arrangement of claim 1, means for guiding the carrier run of the conveying belt slightly downwardly adjacent a charging station of the hot stock and subsequently guiding the carrier run upwardly.

16. In the arrangement of claim 1, one of the deflecting pulleys adjacent a charging station of the hot stock being driven.

17. In the arrangement of claim 1, the carrier layer comprises ledges extending at each end thereof beyond the underlying heat insulating layer, abutting ledges of the carrier layers of adjacent ones of the plates bridging articulated joints between the links.

18. In the arrangement of claim 1, the first cooling zone defining a tunnel with the carrier run of the conveying belt, labyrinth seal means at respective ends of the first cooling zone tunnel, and a feed line for supplying an inert gas into the sealed cooling zone tunnel.

* * * * *